United States Patent
Ameye et al.

(10) Patent No.: US 9,782,033 B2
(45) Date of Patent: Oct. 10, 2017

(54) APPARATUS AND METHOD FOR PROVIDING METERED AMOUNTS OF INGREDIENT, ESPECIALLY FOR A TAILORED NUTRITION TO INFANTS

(71) Applicant: NESTEC S.A., Vevey (CH)

(72) Inventors: Laurent Ameye, Lausanne (CH); Marilisa Hamaoka-Hermann, Vevey (CH); Simona Stan, Rennaz (CH); Philippe Steenhout, La Tour-de-Peilz (CH); Sze Tan, Chardonne (CH)

(73) Assignee: Nestec S.A., Vevey (CH)

( * ) Notice: Subject to any disclaimer, the term of this patent is extended or adjusted under 35 U.S.C. 154(b) by 79 days.

(21) Appl. No.: 14/390,883

(22) PCT Filed: Apr. 3, 2013

(86) PCT No.: PCT/EP2013/057020
§ 371 (c)(1),
(2) Date: Oct. 6, 2014

(87) PCT Pub. No.: WO2013/150070
PCT Pub. Date: Oct. 10, 2013

(65) Prior Publication Data
US 2015/0088304 A1 Mar. 26, 2015

(30) Foreign Application Priority Data
Apr. 5, 2012 (EP) .................................. 12163411

(51) Int. Cl.
*A47J 31/40* (2006.01)
*A23L 33/15* (2016.01)
(Continued)

(52) U.S. Cl.
CPC ................. *A47J 31/40* (2013.01); *A23L 2/52* (2013.01); *A23L 33/115* (2016.08);
(Continued)

(58) Field of Classification Search
CPC ............ A47J 31/40–31/41; A47J 31/60; A23L 2/52–2/68; A23L 33/10–33/195; A23L 33/40
See application file for complete search history.

(56) References Cited

U.S. PATENT DOCUMENTS

| | | | | |
|---|---|---|---|---|
| 4,415,809 A | * | 11/1983 | Shields ................. | G01N 21/03 250/339.12 |
| 4,855,601 A | * | 8/1989 | Savoyet ................. | G01N 33/04 250/339.12 |

(Continued)

FOREIGN PATENT DOCUMENTS

| | | |
|---|---|---|
| WO | 2006077259 | 7/2006 |
| WO | 2010003878 | 1/2010 |

OTHER PUBLICATIONS

Russian Office Action for Application No. 2014144430/12(071679), dated Feb. 15, 2017, 10 pages.

*Primary Examiner* — Drew Becker
(74) *Attorney, Agent, or Firm* — K&L Gates LLP (57) ABSTRACT

The present invention relates to an apparatus (1) for providing metered amounts of ingredients to a nutritional composition for use in administration to an infant, in particular the present invention relates to an apparatus for providing individualized nutrition for infants based on the infants' special needs, the apparatus comprises a plurality of containers (2), a plurality of delivery devices (3), input means (14) and a controller (7) adapted to control the metered amounts of ingredients delivered individually from the containers in response to the input. Further, the present invention relates to a method of preparing a nutritional composition for an infant which is tailored to that specific infant.

12 Claims, 1 Drawing Sheet

(51) Int. Cl.
*A23L 33/115* (2016.01)
*A23L 2/52* (2006.01)
*A23L 33/135* (2016.01)
*A23L 33/00* (2016.01)
*A23L 33/17* (2016.01)

(52) U.S. Cl.
CPC ............. *A23L 33/135* (2016.08); *A23L 33/15* (2016.08); *A23L 33/17* (2016.08); *A23L 33/40* (2016.08); *A47J 31/402* (2013.01); *A47J 31/404* (2013.01)

(56) References Cited

U.S. PATENT DOCUMENTS

| | | | | |
|---|---|---|---|---|
| 5,068,116 A * | 11/1991 | Gibney | ................ | B67D 1/0016 426/231 |
| 5,983,709 A * | 11/1999 | O'Keeffe | ................ | G01N 33/06 356/436 |
| 6,147,502 A * | 11/2000 | Fryer | ................ | G01N 33/06 324/636 |
| 7,762,181 B2 * | 7/2010 | Boland | ................ | A47J 31/40 99/321 |
| 8,230,774 B1 * | 7/2012 | Hunte | ................ | A47J 31/401 222/129.4 |
| 2004/0261625 A1 * | 12/2004 | Fowlkes | ................ | A47J 31/007 99/331 |
| 2006/0278093 A1 * | 12/2006 | Biderman | ................ | A47J 31/40 99/282 |
| 2007/0020357 A1 * | 1/2007 | Uni | ................ | A01J 5/0135 426/72 |
| 2008/0110935 A1 * | 5/2008 | Huber | ................ | A47J 31/404 222/221 |
| 2010/0139361 A1 * | 6/2010 | Sinnema | ................ | A47J 31/401 73/1.74 |
| 2010/0151083 A1 * | 6/2010 | Klier | ................ | A23G 9/045 426/66 |
| 2011/0052764 A1 * | 3/2011 | Bulgin | ................ | A47J 31/401 426/231 |
| 2012/0152125 A1 * | 6/2012 | Yoakim | ................ | A47J 31/52 99/280 |
| 2014/0271548 A1 * | 9/2014 | Brito-De La Fuente | ................ | A47J 31/401 424/93.1 |

* cited by examiner

APPARATUS AND METHOD FOR PROVIDING METERED AMOUNTS OF INGREDIENT, ESPECIALLY FOR A TAILORED NUTRITION TO INFANTS

CROSS REFERENCE TO RELATED APPLICATIONS

The present application is a National Stage of International Application No. PCT/EP2013/057020, filed on Apr. 3, 2013, which claims priority to European Patent Application No. 12163411.7, filed Apr. 5, 2012, the entire contents of which are being incorporated herein by reference.

FIELD OF THE INVENTION

The present invention relates to an apparatus for providing metered amounts of ingredients to a nutritional composition for use in administration to an infant, in particular the present invention relates to an apparatus for providing individualized nutrition for infants based on the infants' special needs. Further, the present invention relates to a method of preparing a nutritional composition for an infant which is tailored to that specific infant.

BACKGROUND OF THE INVENTION

The appropriate nutrition for an infant during the first 4 to 6 months of their life is universally considered to be their mother's own breast milk. However, in some cases feeding of infants with their mother's milk is insufficient and may result in unsatisfied growth. An example hereof is preterm infants which, if fed entirely with human breast milk, will need a higher amount of certain nutrients and a higher energy content than what is present in breast milk. Preterm or premature infants which are infants born before the 37$^{th}$ week of gestation, may have a low body weight. Thus, a mother's breast milk needs to be supplemented with some nutrients. Another example where the mother's milk may be insufficient for an infant is infants which are small for their gestational age. Such infants will also need a supplement of some nutrients to the breast milk. Still another example of mother's milk being insufficient for an infant may be term infants fed with their mothers' breast milk, but where the mothers breast milk is low in some nutrients, for example contains a low fat content or is depleted from fat. Also in this case, the mother's milk should be fortified or supplemented.

In some cases breast feeding however is inadequate or unsuccessful or inadvisable for medical reasons or the mother chooses not to breast feed either at all or for a period of more than a few weeks. Standard infant formulas is developed for these situations, however infants fed with infant formulas may not necessarily need the same amount of all nutrients. In some cases an infant fed with infant formulas may need a higher content of some nutrients than present in the conventional infant formulas. This could for example be infants small in weight who need a higher fat and energy content.

Common for all the above mentioned infants are that neither commercially available infant formulas nor human breast milk have a nutritional composition which is optimal for all infants, in particular preterm infants. Thus, some infants will need a supplement of some nutrients as compared to human breast milk and conventionally infant formulas to optimise their growth. However, the need of nutrients is very individual from one infant to another one.

Today different infant formulas are available on the market, both for term infants and preterm infants. However, all known infant formulas have a fixed amount of nutrients and it is not possible to adjust the content of the nutrients according to individual needs. Some nutritional supplementary compositions, fortifiers, are also known in the art but all of them also contain specific amounts of nutrients, such as proteins, carbohydrate and fat. Thus, there is a need in the art for an apparatus for preparing tailored individual nutritional compositions designed for specific infants in order to meet infants' individual nutritional needs. Such an apparatus automatizes the process of preparing individualized nutrition and makes the preparation more convenient, easy and fast.

The international patent application, WO2008/111942 discloses a method of tailoring infant formulas to individual nutritional needs prior to use. The method includes A) determining the desired volume and optimal caloric density of a formula to be fed to a preterm or low birth weight infant; B) obtaining a plurality of base infant formulas, all in liquid form, C) selecting two of the base liquid formulas having a caloric density value above and below the optimal caloric density, D) calculating the volume of each selected base formula needed to produce the desired volumes of an infant formula blend and having the optimal caloric density, E) combining the calculated volumes of the selected base formulas to produce an infant formula blend having the desired volume, optimal caloric density, an osmolarity between 200 and 360 mOsm/Kg water, and a caloric density between 609 and 1082 kcal/L, and F) feeding the resulting formula to a preterm or low birth weight infant.

WO2008/111942, however, do not disclose an apparatus for preparing metered amounts of ingredients based on individual needs of some nutrients.

US2011/0052764 describes dispensers for dispensing nutritional products such as customised nutritional beverages. Some physical data of the customers are taken into consideration. However this apparatus is not adapted for nutritional compositions to be administered to infants and it does not provide tailored nutritional compositions adapted to the specific needs of an infant, especially based on the health parameters of said infant.

US2006/278093 refers to a device with at least two water reservoirs and a method for preparing a fluid food on demand and at a desired consumption temperature. The fluid food can be consumed by a large proportion of the population but the invention is more focused on how providing a fluid product at a desired temperature that developing specific means to obtain a personalized nutritional composition that will be specifically adapted for infant consumption and tailored depending on the infant needs.

Thus, there is an unmet need for an apparatus which can provide a nutritional composition either intended to supplement human breast milk or to make up an infant formula as such, which is tailored specifically for a specific infant.

OBJECT OF THE INVENTION

Thus, an object of the present invention is to provide an apparatus for preparing a nutritional composition which is tailored to the individual nutritional needs of a specific infant.

Another object of the present invention is to provide an apparatus which according to the nutritional requirements of an infant can provide a nutritional composition specifically tailored for feeding the infant and which comprises exactly the amount of nutrients needed for the infant. It is an object of the present invention that the apparatus can provide a nutritional composition which can be given to the infant as the sole nutritional feed, i.e. an infant formula composition, or as a supplement either to commercial preterm or term infant formulas on the market today or as a supplement to human breast milk. With the apparatus according to the present invention, it becomes possible to prepare individualized nutritional compositions, infant formulas as such or supplement compositions, to fulfil the specific infants' nutritional needs. Hereby, the infant will obtain the optimal nutritional feed for said infant and thus obtain an optimal growth.

Still another object of the invention is to provide an apparatus which provides a nutritional composition specifically designed for a specific infant based on inputs from a doctor, which input either can be related to nutrient requirements or to characteristics of the infant.

A further object of the invention is to provide a method of preparing a nutritional composition for an infant, wherein the composition is made so that it comprises amounts of nutrients which are needed for a specific infant.

SUMMARY OF THE INVENTION

Thus, one aspect of the invention relates to an apparatus for providing metered amounts of ingredients to a nutritional composition for use in administration to an infant, the apparatus comprises:
  a plurality of containers, each containing one or more ingredients for the nutritional composition,
  a plurality of delivery devices, each being connected to a container and adapted to deliver from a container a metered amount of the one or more ingredients, to form part of the nutritional composition, to a receptacle,
  input means, such as a graphical user interface, adapted to receive an input from a user relating to one or more amounts of ingredients to be delivered from the apparatus,
  a controller being adapted to control the metered amounts of ingredients delivered individually from the containers by the delivery devices in response to the input from the user.

The apparatus may further comprise or have access to a data base storing values of the nutrient content(s) of the ingredients present in the containers, and wherein the controller is adapted to
  retrieve from the data base the amount of nutrient(s) in an ingredient,
  determine the amounts of ingredient to be delivered from the containers corresponding to amounts of nutrients requested by the user through the input means, and
  control the delivery devices to deliver into the receptacle the determined amounts of ingredient from a container.

The apparatus may further comprise or have access to:
  a database storing recommended intake values of nutrients as a function of health parameters of an infant,
  a database storing values of nutrient content(s) of the ingredients present in the containers,
wherein
  the input from a user relating to one or more amounts of ingredients to be delivered from the apparatus is health parameters of an infant,
  the delivery devices being adapted to retrieve from the data base recommended intake values of nutrients corresponding to the health parameters input, and determine the amounts of ingredient to be delivered from one or more of the containers accordingly.

In an embodiment of the invention, the nutritional composition is an infant formula, a starter infant formula, a follow-on formula, an infant cereal composition, fortified milk, such as human or animal milk, a fortified infant formula or a nutritional supplement (such as a supplement to either milk, such as human breast milk or animal milk, e.g. bovine milk, or as supplement to a conventional infant formula), also called a nutritional fortifier.

In a particular embodiment, the nutritional composition is an infant formula.

The containers are preferably single use containers.

The apparatus may preferably comprise sanitizing means to maintain sterile conditions inside the apparatus and, preferably, comprises means, such as an ozone source and/or lighting means for exposing the inside of the apparatus to UV-light. The apparatus may also preferably comprise a cabinet (i.e. a sealed housing surrounding the apparatus) to prevent ingress of contaminant inside the apparatus.

The apparatus may preferably deliver the metered amounts of ingredients into a receptacle, preferably being a pouch for tube feeding, feeding bottle/nurser or a syringe.

The one or more of the delivery devices may preferably comprise a metering pump for metering of ingredients, typical being liquid or powdery.

In some embodiments there is at least a part of the ingredients (or all of them) that are liquid. In some other embodiments there are liquid and powdered ingredients.

In some other embodiments the ingredients are powdered.

The one or more of the delivery devices may preferably comprise a metering device, such as a screw feeder, an extruder, a gas driven fluidifier, typically for metering a solid substance, such as a powder.

The apparatus may for example comprise weighting cells for weighting one or more of the plurality of containers.

The apparatus may preferably comprise a mixing device for mixing the ingredients delivered.

In some embodiments the nutritional composition will be a powder.

In some embodiments the nutritional composition will be liquid. Indeed the apparatus may comprise a liquefaction device, such as a liquid source and a mixer, to provide the composition as liquid or liquefied substance.

The apparatus may further comprise or have access to an analyser (e.g. a milk analyser device) for analysing amounts of nutrients in the composition (e.g. milk), or is adapted to receive values for amounts of nutrients in the composition (e.g. milk), and wherein the apparatus is adapted to determine the amounts of ingredients to be delivered based on the input from the user representing one or more ingredients to be delivered and the actual nutrients in the composition (e.g. milk). The analyser may be a milk analyser such as human milk or substitutes.

The apparatus may further comprise or have access to a database storing regulatory and/or scientific data of recommended maximum and/or minimum intake values of nutrients for an infant.

The apparatus may further comprise or have access to a database storing incompatibility data of nutrients.

The apparatus may further comprise or have access to a database storing data of reactions of infants previous fed with a composition produced by the apparatus according to the invention or in general.

Preferably, the ingredients are selected from the group consisting of colostrums, pre-made supplementation compositions, infant formulas, human milk fortifiers, preterm infant formulas, infant formulas, water and compositions comprising one or more nutrient.

Preferably the one or more nutrient is selected from the group of proteins, lipids, carbohydrates, vitamins, minerals, nucleotides, probiotics, prebiotics, milk oligosaccharides, growth factors, milk fractions, antioxidants.

Preferably the volume of the composition is input and the amounts of ingredients are determined according to the desired volume of the final product.

Another aspect of the invention relates to a method of preparing a nutritional composition to be administered to an infant, wherein said composition is tailored to a specific infant, and wherein the method determines amounts of individual ingredients to be present in the composition from recommended intake values of nutrients and/or health parameters of a specific infant.

Preferably the method is executed by use of a computer.

Preferably said prepared nutritional composition further is tailored to a specific administration, such as enteral administration.

In general the various aspects of the invention may be combined and coupled in any way possible within the scope of the invention. These and other aspects, features and/or advantages of the invention will be apparent from and clarified with reference to the embodiments described hereinafter.

The present invention will now be described in more details.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Definitions

Prior to discussing the present invention in further details, the following terms and conventions will first be defined.

Unless defined otherwise, all technical and scientific terms used herein have the same meaning as commonly understood by one of ordinary skill in the art.

The term "infant" will in the context of the present invention mean a child under the age of 2 years, preferably the infant is under the age of 12 months, such as under the age of 9 months, particularly under the age of 6 months.

In the context of the present invention, an infant may be any term infant or preterm infant. In an embodiment of the invention the infant is a preterm infant.

The term "term infant" refers to infants born at term or 37 weeks or more after gestation.

The term "preterm infant" refers to infant who are born before the $37^{th}$ week of gestation.

The term "infant formula" as used herein refers to a nutritional composition used to feed infants.

By the term "fortifier" is meant any composition used to fortify or supplement either milk, e.g. human breast milk, or infant formulas. A fortifier may also be termed as a supplementation composition and the terms may be used interchangeably. A fortifier refers to a composition which comprises one or more nutrients having a nutritional benefit for infants, both preterm infants and term infants. A fortifier composition or supplementation composition may be compositions comprising high amount of nutrients such as lipids, proteins, carbohydrates, minerals, vitamins, probiotics or prebiotics.

The term "nutrient" refers in the context of the present invention to compounds having a beneficial effect on the body, e.g. to provide energy or necessary growth. Examples of nutrients are proteins, carbohydrates, lipids, vitamins and minerals, nucleotides, probiotics, prebiotics, milk oligosaccharides, growth factors, milk fractions, antioxidants.

The term "ingredient" refers to a composition which may contain one or more nutrients, and it is the ingredients which are present in the containers of the apparatus and mixed to form a nutritional composition for an infant. The ingredient may also be referred to as a source of nutrients.

An ingredient may for example be nutrients as such, e.g. lactose powder or a protein powder of casein and whey protein. However, an ingredient may also be a mixture of different nutrients, such as an emulsion comprising lipids, emulsifiers, stabilizers and vitamins. Another example of an ingredient is powdered milk which comprises protein, carbohydrates, lipids, vitamins and minerals. Another example of an ingredient is a fortifier composition, for example a fortifier comprising protein, carbohydrates, lipids, vitamins and minerals as well as emulsifiers and stabilizers. Such fortifiers compositions may be available in many different forms and the amount of the different nutrients may vary from one fortifier composition to another. A further example of an ingredient may be infant formulas, such as infant formulas for term infants, for preterm infants, for low birth weight infants and for toddlers.

In an embodiment of the invention, the ingredients are selected from the group consisting of colostrums, pre-made supplementation compositions, infant formulas, human milk fortifiers, preterm infant formulas, infant formulas, water and compositions comprising one or more nutrient.

When using the expression "providing metered amounts of ingredients to a nutritional composition for use in administration to an infant", this encompasses:
  adding metered amounts of ingredients to an existing nutritional composition such as for example the addition of a fortifier to human milk, then the administration to an infant of the final nutritional composition.
  and/or preparing a nutritional composition by mixing metered amounts of ingredients, then the administration to an infant of said nutritional composition.

By the expressions "health parameters of the infant" it is meant to be parameters related to the infant such as physical, physiological or birth-related data enabling the determination of the nutritional needs of the infant and having an incidence of the composition of the nutritional composition. Some non-limiting examples include weight, length, head circumference, the gestational age (age at birth), the corrected age (weeks or months after birth corrected according to the age at birth), the post gestational age (i.e. age after birth or chronological age of infant), the time infant is born before term (i.e. the degree of maturity or the pre-gestational age of the infant), the history of food intake (i.e. the food intake of the infants in the recent past days), the history of weight gain, the failure to thrive, the blood or urine analysis (BUN, calcium, phosphore . . . ).

The input from the user could be health parameters of an infant selected from the list consisting of weight, length, head circumference, gestational age, corrected age, post gestational age, the time infant is born before term, the history of food intake, the history of weight gain, the failure to thrive, the blood or urine analysis (BUN, calcium, phosphore . . . ) and any combinations thereof.

The input from the user could be health parameters of an infant selected from the list consisting of length, head circumference, gestational age, corrected age, post gestational age, the time infant is born before term, the history of food intake, the history of weight gain, the failure to thrive, the blood or urine analysis (BUN, calcium, phosphor . . . ) and any combinations thereof.

In some embodiments the input from the user is a combination of at least two, three, four, five or six health parameters of an infant, such as health parameters selected from the list consisting of weight, length, head circumference, gestational age, corrected age, post gestational age, the time infant is born before term, the history of food intake, the history of weight gain, the failure to thrive, the blood or urine analysis (BUN, calcium, phosphore . . . ).

In some embodiments the input from the user is a combination of at least two, three, four, five or six health parameters of an infant, such as health parameters selected from the list consisting of length, head circumference, gestational age, corrected age, post gestational age, the time infant is born before term, the history of food intake, the history of weight gain, the failure to thrive, the blood or urine analysis (BUN, calcium, phosphore . . . ).

In some embodiments, the input from the user is the weight of the infant and at least another health parameter that can be selected from the above-mentioned lists.

In some embodiments, the input from the user is the length of the infant and at least another health parameter that can be selected from the above-mentioned lists.

In some embodiments, the input from the user is the age of the infants (gestational age, corrected age, post gestational age and/or the time infant is born before term) and at least another health parameter that can be selected from the above-mentioned lists.

In some embodiments, the input from the user is the history of food intake and at least another health parameter that can be selected from the above-mentioned lists.

In some embodiments, the input from the user is the history of weight gain and at least another health parameter that can be selected from the above-mentioned lists.

In some embodiments, the input from the user is the failure to thrive and at least another health parameter that can be selected from the above-mentioned lists.

In some embodiments, the input from the user is the blood or urine analysis (BUN, calcium, phosphore . . . ) and at least another health parameter that can be selected from the above-mentioned lists.

In some embodiments, the input from the user is or is at least the weight and the length of the infant.

In some embodiments, the input from the user is or is at least the weight, the length and the head circumference of the infant.

In some embodiments, the input from the user is or is at least the weight, the length, the head circumference and the post gestational age of the infant.

In some embodiments, the input from the user is or is at least the weight, the length, the head circumference, the post gestational age of the infant and the time infant is born before term.

In some embodiments, the input from the user is or is at least the weight, the length and the post gestational age of the infant.

In some embodiments, the input from the user is or is at least the weight, the length of the infant and the time infant is born before term.

In some embodiments, the input from the user is or is at least the weight, the length, the post gestational age of the infant and the time infant is born before term.

In a particular embodiment, the input from the user is not or not only the weight of the infant.

The "values" of the nutrient content(s) of the ingredients correspond to the amount of nutrient(s) in an ingredient. The values will be adapted depending on the infants' needs. The recommended intake values of nutrients are known by a skilled man since they can be given by law and/or provided by qualified experts (e.g. Espghan Committee on Nutrition). Some examples of values can be found in C. Agostoni et al. "Enteral Nutrient Supply for Preterm Infants: Commentary From the European Society for Paediatric Gastroenterology, Hepatology, and Nutrition Committee on Nutrition", JPGN, Volume 50, Number 1, January 2010. The recommendations will vary depending on the health parameters of the infant.

Figure 1:
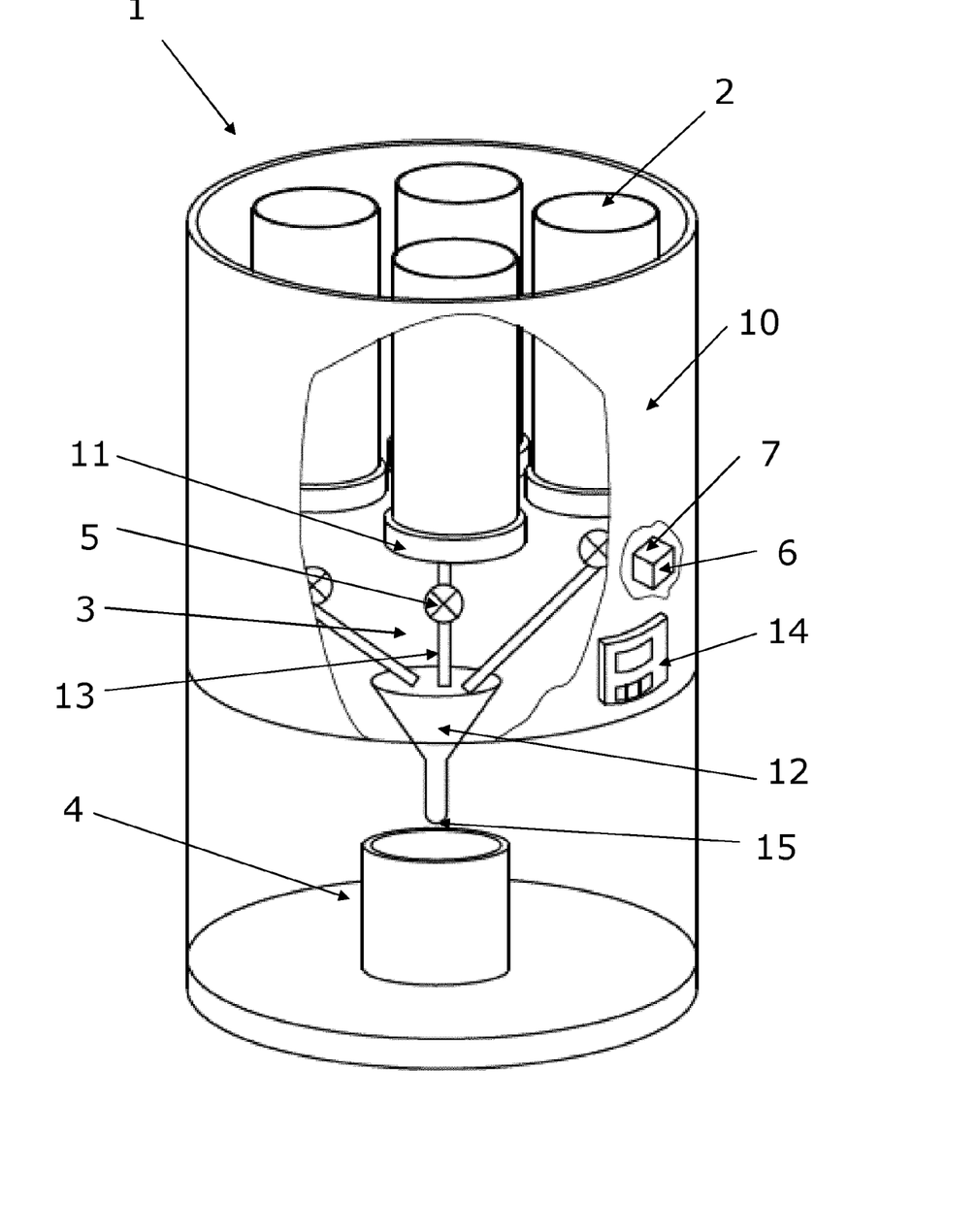
FIG. 1 shows schematically an apparatus for providing metered amounts of ingredients to a nutritional composition for use in administration to an infant, such as for use in an enteral administration, according to a first embodiment of the invention.

The description will now be described further with reference to the FIGURE.

Reference is made to FIG. 1 which shows schematically an apparatus 1 for providing metered amounts of ingredients to a nutritional composition for use in administration to an infant. The nutritional composition is preferably an infant formula, a starter infant formula, a follow-on formula, an infant cereal composition, fortified milk, such as fortified human or animal milk, a fortified infant formula or a nutritional supplement.

As outlined herein, the output from the apparatus is metered amounts of ingredients and the amounts are metered so that they provide either alone or in combination with other ingredients, such as breast milk, a nutritional composition that is tailored to a specific infant. While the scope of the invention is not limited to a composition for use in an enteral administration (i.e. by mouth or by tube feeding), such administration has been found to be valuable.

As shown in FIG. 1, the apparatus comprises a plurality of containers 2 each containing one or more ingredients for the nutritional composition. The containers 2 are typically disposable containers in the sense that a container is filled with one or several specific ingredient(s) and is sealed preferably at a factory site. However, refillable containers 2 may also be used in a way where the ingredients are e.g. poured from a pouch or similar packaging used for shipment purposes into a container. Requirements as to sealing are typically selected in accordance with a desired demand as to a specific ingredient's sealing from the environment. The sealing is provided in an ordinary manner, e.g. by a lid welded to the container, and so as to seek to prevent refilling of the container to avoid unwanted contamination. Thus, the containers 2 are single use containers. In many preferred embodiments, the sealing is a sheet of plastic that may be penetrated by a knife or similar sharp instruments.

The apparatus further comprising a plurality of delivery devices 3. Each of the delivery devices is connected to a container 2 and is adapted to deliver from a container 2 a metered amount of the one or more ingredients contained in the container 2, which one or more ingredients are to form part of the composition.

Although the preferred embodiment shown in FIG. 1 comprises a delivery device 3 for each container 2, a single delivery device 3 may be applied in which cases the single delivery device 3 is adapted to connect individually to a single container 2. One such implementation may be a carrousel with a receptacle. The carrousel is rotable in a controlled manner, so that the receptacle may be placed by rotation of the carrousel below a selected container 2. Once the receptacle is placed below a selected container 2, the controller 7 controls a shut-off valve regulating the flow out of the container to open so that the ingredient is dosed into the receptacle. The flow of ingredients out of the container 2 is provided by the gravity optionally assisted by vibrating the container 2 to loosen up e.g. powdery substances in the container 2. The amount of ingredients may be determined by the opening time of the shut-off valve and/or a weighting cell arranged to weight the receptacle and its content.

The delivery devices 3 deliver the metered amounts of ingredients to a receptacle 4. In the preferred embodiments of FIG. 1, the delivery devices 3 comprise a socket 11 into which a container 2 fits in the sealed engagement. The socket 11 typically comprises a sharp element (not shown) which breaks open the seal of the container 2 when the container 2 is arranged in the socket 11. The delivery device 3 further comprises a tube 13 which open into the socket 11 at one distal to receive ingredients from the container 2 and the other distal end opens into a funnel shaped collector 12. The funnel shaped collector comprising a lid (not shown) to avoid entrainment of pollutions. The amounts of ingredients flowing through the tube 13 is determined by a metering device 5 comprised in the delivery devices 3.

The metering device 5 may be in the form of a metering pump for metering of ingredients. Such metering pumps may meter liquid as well as powdery material. Other metering devices 5 applicable in connection with the present invention include screw feeders, extruders, gas driven fluidifiers, typically for metering solid substance, such as powder.

As an alternative to the metering devices 5 arranged in the delivery devices 3, weighting cells may be arranged to weight one or more of the plurality of containers 2. The decrease in weight may be used to determine the amount of ingredients delivered from a container 2. Such weighting cells may also be used in combination with the metering devices 5 to verify the amounts and/or to maintain a record on the amount of ingredient present in the container, the latter can be used to signal that the container is empty or nearly empty and needs replacement.

Often the ingredients being delivered from the containers 2 need to be mixed and the apparatus 1 may therefore comprise a mixing device for mixing the ingredients delivered. Such a mixing device may be a stirrer applied to operate e.g. in the funnel shaped collector 12 so that the ingredients are mixed when delivered from the containers 2. However, this requires that the ingredients are delivered from the containers 2 to the funnel shape collector 12 at the same time which may not always be the case. If the ingredients are delivered sequentially, the mixing may be a vibrator vibrating the receptacle 4.

In many cases the desire is to produce a ready to use infant formula—or at least a liquid product—and in such cases, the apparatus comprising a liquefaction device. Such a liquefaction device may be a liquid source and a mixer, to provide the composition as liquid or liquefied substance, and the liquid source may be one or more of the containers 2 containing the required liquid or it may be an external liquid source such as water. The liquid can be stored in the apparatus such as in a dedicated reservoir. The liquid can be made sterile in the reservoir or be sterilized on demand when supplied to the mixer by sterilizing means such as UV light, heating or ozone.

The apparatus also comprises input means 14, such as a graphical user interface, adapted to receive an input from a user relating to one or more amounts of ingredients to be delivered from the apparatus 1. The input from the user may vary depending on the needs. However, the input of the user relating to one or more amounts of ingredients to be delivered may preferably and advantageously be characteristics of the infant, such as weight, length, post-gestational age, pre-gestational age (i.e. the time infant is born before term), head circumference, the history of food intake (i.e. the food intake of the infants in the recent past days), the history of weight gain, the failure to thrive, the blood or urine analysis (BUN, calcium, phosphore . . . ) etc on the basis of which characteristics a nutritional content of an infant formula can be derived (e.g. by consulting a table stored in a database). Such derivations of nutritional content are typically performed by a controller 7 which either is a part of the apparatus or the apparatus is in data communication with such controller 7.

Once the nutritional need is determined, the various amounts of ingredients stored in the containers, which is sufficient to meet the nutritional need are derived. In other embodiments, the input from the user may be the needs of different nutrients and/or the specific amounts of ingredient to be delivered.

A controller 7 is comprised in the apparatus—or the apparatus is connected to a controller 7. The controller 7 is adapted to control the metered amounts of ingredients delivered individually from the containers by the delivery devices 3 in response to the input from the user. Thus, once the actual amounts of ingredients to be delivered are derived, the controller 7 controls the action of the metering devices, such that these amounts are moved from the containers 2, via the tubes 13, through the funnel shaped collector 12 and into the receptacle 4.

The receptacle 4 may advantageously be a pouch for tube feeding, a feeding bottle/nurser or a syringe.

The ingredients contained in the containers 2 are typically selected from compositions containing nutrients which are essential for infants, such as proteins, lipids, carbohydrates, vitamins and minerals. The ingredients may also be compositions comprising probiotics, prebiotics, nucleotides, milk oligosaccharides, colostrum, growth factors, milk fractions, antioxidants or simply water. Water if present is preferably sterile. An ingredient may comprise one nutrient or be a combination of two or more nutrients. An ingredient may also be a conventional infant formula found on the market, both preterm infant formulas and term infant formulas, a premade supplementation composition or an infant formula beforehand supplemented with one or more supplementation composition.

The apparatus 1 may further comprise or have access to a data base 6 storing values of the nutrient content(s) of the ingredients present in the containers 2. When such a data base 6 is used, the derivation of the actual amounts to be delivered from the containers 2 is carried out by the controller 7, and includes that the controller 7 is adapted by suitable software instructions to retrieve from the data base 6 the amount of nutrient(s) in an ingredient. Once the amount of nutrient(s) is know by the controller 7, it determines the amounts of ingredient to be delivered from the containers 2 corresponding to amounts of nutrients requested by the user through the input means 14. The data base can be stored in a memory of the controller of the apparatus or may be stored in a remote server accessible via a communication network. In case of a remote data retrieving system, the apparatus comprises a communication module (e.g., wifi, modem, Ethernet . . . ) enabling it to exchange data with the external network.

It is noted that in many instances, the input by the user is not a nutrient request but characteristics of a specific infant which constitute a nutrient request indirectly. In such cases, the controller 7 translates the characteristic input to a nutrient content e.g. by consulting a database storing values of nutrients as function of the input characteristic.

Based on the determined amounts of ingredients, the controller 7 controls the delivery devices 3 to deliver into the receptacle 4 the determined amounts of ingredient from a container 2.

Thus, the controller 7 is typically a programmable processor cooperating with memory storing data and instructions.

As an alternative to the database look-up for determining the amounts of ingredients, the determination may be based on a set of formulas on the corresponding between input and delivered amounts. In this case, the processor further comprising an algorithm for calculating the amounts of ingredients to be delivered from the containers 2 based on the input from a user representing one or more amounts of ingredients.

As outlined above, the apparatus 1 may comprise or have access to a database 6. Such a database 6 preferably stores as records recommended intake values of nutrients as a function of health parameters of the infant intended to ingest to nutritional composition, such as weight, length, head circumference, post gestational age (i.e. age after birth), pre-gestational age (i.e. the degree of maturity or the time infant is born before term).

As previously mentioned the input from the user could be health parameters of an infant selected from the list consisting of weight, length, head circumference, chronological age, corrected age, post gestational age, the time infant is born before term, the history of food intake, the history of weight gain, the failure to thrive, the blood or urine analysis (BUN, calcium, phosphore . . . ) and any combinations thereof.

Included in that database 6—or implemented as a separate database are storing values of nutrient content(s) of the ingredients present in the containers 2. Such database(s) 6 is(are) typically utilised in a set-up of the invention in which the input from a user relating to one or more amounts of ingredients to be delivered from the apparatus 1 is health parameters of an infant and the delivery devices 3 is adapted to retrieve from the data base 6 recommended intake values of nutrients corresponding to the health parameters input, and determining the amounts of ingredient to be delivered from one or more of the containers 2 accordingly.

As a simplified example (E1), the input from the user is the following health parameters:
Weight of infant=2.000 kg
Length of infant=35 cm
Chronological age of infant=5 weeks
Time infant is born before term=8 weeks
Another example (E2) could be:
Weight of infant=1.000 kg
Length of infant=35 cm
Gestational age (at birth)=24 weeks
Corrected age=26 weeks
Chronological age of infant=2 weeks
Time infant is born before term=16 weeks
Another example (E3) could be:
Weight of infant=1.700 kg
Length of infant=42 cm
Gestational age (at birth)=30 weeks
Chronological age of infant=2 weeks
Corrected age=32 weeks Time infant is born before term=10 weeks "Chronological age" refers to the age of the infant after birth, i.e. the post gestational age.

"Time infant is born before term" refers to the period of time, e.g. in days or weeks, an infant is born before the term of birth, e.g. an infant can be born 8 weeks before expected, the term.

Based on the example E1 for instance, the controller 7 makes a first determination step from the data base resulting in that the nutritional content of the composition should be:
Component A=1 mg
Component B=1.3 mg
Component C=11.3 mg The controller 7 makes a second determination step from the second data base pertaining to the nutritional content of the ingredients contained in the containers 2:
Container I=0.01 mg component A per mg ingredient
Container II=0.03 mg component B per mg ingredient
Container III=0.5 mg component C per mg ingredient And in a third determination step, the controller 7 calculates on the basis thereof the amounts of each ingredient to be delivered from each container 2:
From container I=1/0.01=100.00 mg
From container II=1.3/0.03=43.33 mg
From container III=11.3/0.5=22.6 mg Of course, the first and second determination steps or the second and third steps can be theoretically carried out in a single step by the controller.

Once these values have been determined, the delivery devices 3 with the metering devices 5 are controlled so that these amounts are delivered from the containers 2.

In certain preferred embodiments, input by the user furthermore comprises the volume of the nutritional composition. For instance, the volume of the nutritional composition corresponds to the volume of human milk to be fortified. The amounts of ingredients can be determined according to the volume of the nutritional composition and/or the desired volume of the final product.

The volume an infant can ingest per day is restricted. An infant is assumed to be able to intake between 96 and 200 ml fluid per kg per day, preferably 150 to 180 ml per kg per day.

Often contamination of the ingredients by e.g. bacteria is a serious issue and should be avoided. This is particularly important as the nutritional composition is for use in administration to infants, who are particularly sensitive (especially because their immune system is not entirely developed, which is even more the case for preterm infants) and require special care. Therefore, the apparatus 1 according to the present invention may further comprise a cabinet 10 encapsulating in a fluid tight manner the interior of the apparatus 1 to maintain sterile conditions within the apparatus 1. The cabinet 10 may be replaced by any other suitable means allowing preventing ingress of contaminant inside the apparatus. This is particularly important when preparing the nutritional compositions according to the invention since these ones are intended to be administrated to infants. The interior of the apparatus 1 is (or contains) typically the containers 2, the delivery devices 3 and the funnel shaped collector 12. Thereby, the only opening into the interior of the containers 2 is through the mouth 15 of the funnel shaped collector 12, which mouth is sealed by a valve (not shown) also controlled by the controller 7.

Furthermore, sterilisation means (not shown) may be arranged behind the cabinet 10 to obtain and maintain sterile conditions e.g. after the cabinet 10 has been opened for insertions of containers 2. Such sterilisation means is ozone source and/or at least one UV-light source. Maintaining sterile conditions inside the apparatus is particularly important when preparing the nutritional compositions according to the invention since these ones are intended to be administrated to infants.

Infant formulas are nutritional compositions which are designed to give a nutritional diet to an infant which is similar to human breast milk. Infant formulas may be the sole food given to an infant or given as a supplement to solid food.

Fortifier compositions, which may also be termed supplementary compositions, are compositions which are intended to be given to an infant as a supplement to either milk, such as human breast milk or animal milk, e.g. bovine milk, or as supplement to a conventional infant formula available on the market.

When determining the amounts of ingredients to be delivered to a nutritional composition for a specific infant, the milk which the infant would ingest, e.g. the mother's breast milk may be analysed with regard to the content of different nutrients, especially proteins and fats, whereafter the amount of ingredients to be added to the milk is determined as the difference between the actual nutrient content in the milk and the desired nutrient content for the infant.

Therefore, the apparatus may further comprise or has access to a milk analyser for analysing amounts of nutrients in milk, or is adapted to receive values for amounts of nutrients in human breast milk, and wherein the apparatus is adapted to determine the amounts of ingredients to be delivered based on the input from the user representing one or more ingredients to be delivered and the actual nutrients in the milk. In addition, the milk analyser may advantageously be used to analyse the composition prepared by the apparatus.

Another issue that may be important is that the composition to be made may be governmental regulated or regulated in other ways to fulfil certain nutritional restrictions. To handle such issues, the apparatus may further comprise or have access to a database storing such regulatory data of recommended maximum and/or minimum intake values of nutrients for an infant. Upon delivery of ingredients this database is searched for whether the actual delivery will result in a violation of any such regulatory data and in affirmative case, this is signaled to the user before delivery.

In addition, some ingredients may be considered as conflicting or be incompatible when present in the same composition and this issue is handled similarly to the regulator issue above by consulting a database storing data pertaining to such conflicts.

Sometimes the effect of previous administered compositions could advantageously influence the determination of an actual delivery of ingredients. This could for instance be a situation where it has turned out that an infant responds negatively or positively on one or more ingredients. To take such issues into consideration in the determination of an actual delivery of ingredients, the apparatus may further comprise or have access to a database storing data of reactions of infants previous fed with a composition produced by the apparatus, or compositions in general. In addition, the amounts ingested earlier, e.g. the last two, three or four days of a specific infant may also be stored and used in the determination of an actual delivery of ingredient. For instance, if the earlier ingested amounts have produced a negative response and the ingredient(s) or amount causing the negative response is/are identified, the metered amounts of ingredients are tuned to avoid such negative response.

As outlined above, the invention relates to an apparatus for providing metered amounts of ingredients and also to a method of preparing a composition to be administrated to an infant. The method is typically implemented in a computer and may have as output the amounts of ingredients needed to provide the composition. The invention also relates to said method wherein the apparatus 1 according to the invention is used for preparing the composition.

The preparation may be more or less automated as in the apparatus according to the invention or the preparation may be left for suitable trained personnel. The composition is tailored to a specific infant, and the method determines amounts of individual ingredients to be present in the composition typically from recommended intake values of nutrients and/or health parameters of a specific infant. The composition may furthermore be tailored to a specific administration, such as enteral administration.

Another object of the invention is the use of the apparatus 1 according to the invention for preparing a nutritional composition to be administered to an infant, wherein said composition is tailored to the specific needs of an infant. The apparatus 1 would be able to determine amounts of individual ingredients to be present in the composition from recommended intake values of nutrients and/or health parameters of a specific infant. The infant can be a term infant, a preterm infant, a low birth weight infant, a small for gestational age (SGA) infant or a toddler.

In a particular advantageous embodiment the infant is a preterm infant or a low birth weight infant.

In a particular embodiment the infant can be an infant with increased energy needs, for example an infant suffering from a disease such as heart disease or an infant that is small for gestational age.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

For example, a similar apparatus can be used for the administration of a nutritional composition to a child, e.g. a child who is above 2 years old, or above 3 years old, or above 5 years old, or even more.

The invention claimed is:

1. An apparatus for providing metered amounts of ingredients to a starting nutritional composition for use in administration to an infant, the apparatus comprising:
   a plurality of containers, each containing one or more ingredients for a final nutritional composition;
   one or more databases storing values of nutrient contents of the one or more ingredients present in the plurality of containers and storing recommended intake values of nutrients corresponding to health parameters of the infant;
   a plurality of delivery devices, each connected to a corresponding container of the plurality of containers and adapted to deliver from the corresponding container a metered amount of the one or more ingredients, to form part of the final nutritional composition, to a receptacle;
   an input member adapted to receive an input from a user, the input comprising health parameters of the infant, the input relating to amounts of the one or more ingredients to be delivered from the apparatus;

a controller adapted to 1) control the metered amounts of the one or more ingredients delivered individually from the plurality of containers by the plurality of delivery devices in response to the input from the user, 2) retrieve from the one or more databases the recommended intake values of nutrients corresponding to the input from the user and the values of nutrient contents in the one or more ingredients, 3) determine the metered amounts of the one or more ingredients to be delivered from the one or more of the plurality of containers corresponding to the input from the user, and 4) control the plurality of delivery devices to deliver into the receptacle the determined amounts of the one or more ingredients from the plurality of containers based on the input from the user and amounts of nutrients in the starting nutritional composition; and an analyzer configured to analyze the amounts of nutrients in the starting nutritional composition and the final nutritional composition prepared from the starting nutritional composition by the apparatus.

2. The apparatus according to claim 1, wherein the final nutritional composition is selected from the group consisting of an infant formula, a starter infant formula, a follow-on formula, an infant cereal composition, fortified milk, fortified infant formula and a nutritional supplement.

3. The apparatus according to claim 1, further comprising a liquefaction device to provide the starting nutritional composition as a liquid or liquefied sub stance.

4. The apparatus according to claim 1, wherein the one or more databases store regulatory data of recommended maximum and/or minimum intake values of nutrients for the infant.

5. The apparatus according to claim 1, wherein the one or more databases store incompability data of nutrients.

6. The apparatus according to claim 1, wherein the one or more databases store data of reactions of infants previously fed with the final nutritional composition produced by the apparatus.

7. The apparatus according to claim 1, wherein the one or more ingredients are selected from the group consisting of colostrums, pre-made supplementation compositions, infant formulas, human milk fortifiers, preterm infant formulas, water and compositions comprising one or more nutrients.

8. The apparatus according to claim 7, wherein at least one of the one or more nutrients is selected from the group consisting of proteins, lipids, carbohydrates, vitamins, minerals, nucleotides, probiotics, prebiotics, milk oligosaccharides, growth factors, milk fractions, and antioxidants.

9. The apparatus according to claim 1, wherein the controller is configured to use a desired volume of the final nutritional composition inputted by a user to determine the amounts of the one or more ingredients according to the desired volume of the final nutritional composition.

10. The apparatus according to claim 1, wherein the health parameters of the infant are selected from the group consisting of a weight, a length, a head circumference, a gestational age, a corrected age, a post gestational age, a time the infant is born before term, a history of food intake, a history of weight gain, failure to thrive, a blood or urine analysis and combinations thereof.

11. The apparatus according to claim 1, further comprising a sanitizer providing irradiation or a sanitizing fluid to maintain sterile conditions of the apparatus.

12. An apparatus for providing metered amounts of ingredients to a starting nutritional composition for use in administration to an infant, the apparatus comprising:

a plurality of containers, each containing one or more ingredients for a final nutritional composition;

a plurality of delivery devices, each connected to one of the plurality of containers and adapted to deliver from the corresponding container a metered amount of the one or more ingredients, to form part of the final nutritional composition, to a receptacle;

an input member adapted to receive the input from a user, the input comprising health parameters of the infant and the input relating to amounts of the one or more ingredients to be delivered from the apparatus;

a controller adapted to control the metered amounts of the one or more ingredients delivered individually from the plurality of containers by the plurality of delivery devices in response to the input from the user, the controller configured to determine the amounts of the one or more ingredients to be delivered based on the input from the user relating to the one or more ingredients to be delivered and amounts of nutrients in the starting nutritional composition; and an analyzer configured to analyze the amounts of nutrients in the starting nutritional composition and the final nutritional composition prepared from the starting nutritional composition by the apparatus.

* * * * *